(12) United States Patent
Jeuffe

(10) Patent No.: US 8,100,168 B2
(45) Date of Patent: Jan. 24, 2012

(54) DEVICE FOR REHEATING THE WATER OF THE WINDSCREEN WASHERS OF A MOTOR VEHICLE

(75) Inventor: Gerard Jeuffe, Feucherolles (FR)

(73) Assignee: Peugeot Citroen Automobiles SA, Velizy Villacoublay (FR)

( * ) Notice: Subject to any disclaimer, the term of this patent is extended or adjusted under 35 U.S.C. 154(b) by 1133 days.

(21) Appl. No.: 11/576,149

(22) PCT Filed: Sep. 26, 2005

(86) PCT No.: PCT/FR2005/050780
§ 371 (c)(1),
(2), (4) Date: Jun. 1, 2007

(87) PCT Pub. No.: WO2006/035179
PCT Pub. Date: Apr. 6, 2006

(65) Prior Publication Data
US 2009/0242171 A1 Oct. 1, 2009

(30) Foreign Application Priority Data
Sep. 30, 2004 (FR) ...................................... 04 52200

(51) Int. Cl.
*B60S 1/50* (2006.01)

(52) U.S. Cl. ......... 165/41; 165/51; 165/95; 165/104.32; 165/135; 239/284.1; 239/129; 239/130; 123/41.51; 123/41.54; 237/12.3 B; 237/12.3 R

(58) Field of Classification Search ............... 239/284.1, 239/129, 130; 165/41, 51, 95, 104.32, 135; 123/41.51, 41.54; 237/12.3 B, 12.3 R
See application file for complete search history.

(56) References Cited

U.S. PATENT DOCUMENTS

| 1,843,828 | A | * | 2/1932 | McNaught | 239/284.1 |
| 3,292,866 | A | * | 12/1966 | Benner | 239/130 |
| 3,888,412 | A | * | 6/1975 | Lindo | 237/12.3 B |
| 4,480,598 | A | * | 11/1984 | Berrigan | 123/41.51 |
| 5,680,833 | A | * | 10/1997 | Smith | 123/41.54 |
| 5,957,384 | A | * | 9/1999 | Lansinger | 239/284.1 |
| 6,557,627 | B2 | * | 5/2003 | Moltzheim et al. | 123/41.49 |
| 6,711,776 | B1 | * | 3/2004 | Krause et al. | 15/250.05 |
| 7,000,576 | B2 | * | 2/2006 | Olson | 123/41.51 |

FOREIGN PATENT DOCUMENTS

| DE | 3704325 A1 | 8/1988 |
| DE | 10213062 A1 | 1/2004 |
| GB | 2016393 A | * 9/1979 |
| KR | 2001113055 A | * 12/2001 |

OTHER PUBLICATIONS

International Search Report mailed Jan. 30, 2006 in PCT/FR2005/050780.

* cited by examiner

*Primary Examiner* — John Ford
(74) *Attorney, Agent, or Firm* — Nicolas E. Seckel

(57) ABSTRACT

The invention relates to a device for reheating the water of the windscreen washers of a motor vehicle comprising, in the engine compartment thereof, a degassing box (1) forming part of the engine cooling system, and at least one tank (3) for pressurised washing water, said tank being associated with a circulation pump which pumps water therefrom and supplies said water to nozzles for spraying the same over the windscreens. The inventive device is characterised in that the tank (3) at least partially surrounds the degassing box (1), leaving a separation space of a determined thickness therebetween, and a double-walled hollow body (4) is integrated into said space, defining a closed thermal insulating volume.

19 Claims, 1 Drawing Sheet

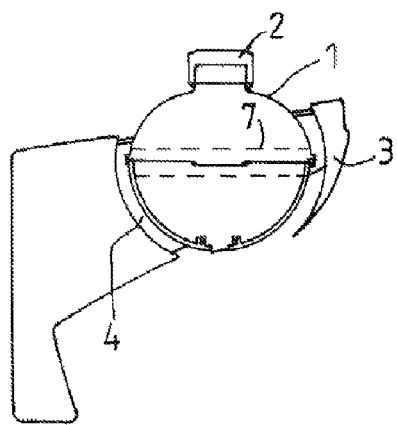
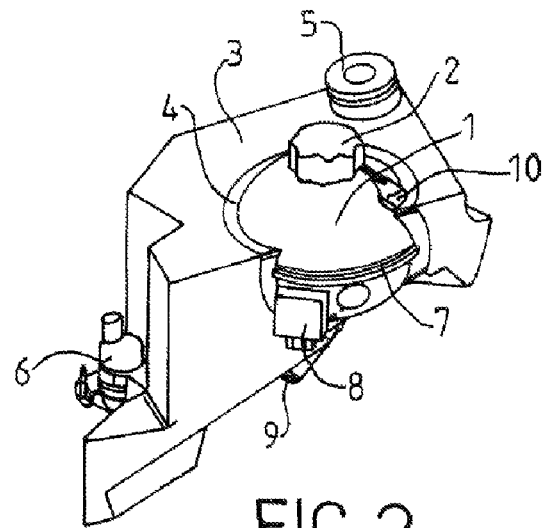
FIG.1    FIG.2
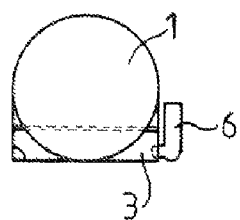
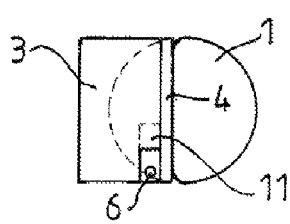
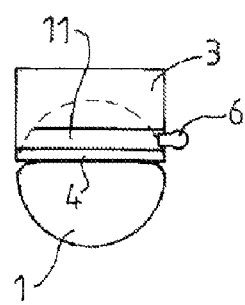
FIG.3a    FIG.3b    FIG.3c

DEVICE FOR REHEATING THE WATER OF THE WINDSCREEN WASHERS OF A MOTOR VEHICLE

The present invention concerns a device for heating the window-washer fluid of a motor vehicle using the calories from the degassing chamber of the cooling system of this vehicle.

It is known that in a motor vehicle, the cooling of the engine and of various accessories directly linked to it is accomplished by means of a cooling system filled with an appropriate fluid, usually water supplemented with a product designed to limit vaporization to a certain level. This system goes through the engine cylinder head in particular, via tubing into which the water enters under pressure from a water pump, with connecting branch lines and piping linking this system to a radiator with a fan rotating in front of it. The fan is activated as soon as the temperature in the system reaches a predetermined threshold.

This cooling system, which is found in every motor vehicle, has to have connected to it an empty space, confined within a closed container known as a "degassing chamber", the purpose of which is to separate, if need be, the fluid and its vapor from the portion of combustion gases and outside air that have entered the system while the motor was running or when this system was filled with the fluid it contains.

This degassing chamber serves an essential function in regulating the cooling system and making it safe, in particular by lowering the quantity of gas contained in this system to a maximum level set by appropriately calibrating an exhaust valve. The presence of too high a quantity of gas can negatively affect the performance of the system, for example, causing the water pump to dry up, damaging the engine cylinder head in the event of insufficient cooling. Or even worse, if the circulation of the fluid does not reach an appropriate rate, cavitation processes are triggered that can cause certain essential parts to deteriorate. Or lastly, the discharge of water to the outside may increase, through an overflow orifice in the system. These various effects are the consequences of an excessive presence of gas.

However, in order to attain the requisite performance of the degassing chamber, its decisive role requires not only that its location be determined with precision above the level of the cylinder head and the radiator, but that the temperature of the fluid in the cooling system also rise relatively quickly, taking about 15 minutes for a diesel engine to reach 60°, or 5 minutes for a gasoline engine, also to reach 60°, with a fluid volume of between 1.5 and 2 liters generally, and this temperature must be kept permanently within the immediate range without marked variations.

In particular, if during operation a significant, sudden loss of calories occurs in the degassing chamber, leading to a pressure reduction in the system and a corresponding increase in the vaporization of the fluid, the above-cited problems, which occur immediately, are likely to lead to insufficient cooling of the cylinder head and other parts of the vehicle affected by the system. In the worst case, this may cause the engine to break down and immediately render the vehicle immobile, leading to excessive repair costs.

Another completely different problem to address is the optimal way to wash the windshield and/or the rear window of the vehicle, and if need be, to clean the headlights. A pressurized water jet is directed at the relevant glass surfaces by means of spray nozzles or other, similar instruments that work in conjunction with wiper blades or similar scraping elements. The fluid used for this is stored in one or more reservoirs housed inside the vehicle body, particularly in the engine compartment near the degassing chamber of the cooling system. It could be particularly advantageous to raise the temperature of this fluid to a certain point, since hot water obviously has better window-cleaning power, being better able to detach and remove the various kinds of soilage that have accumulated.

A conventional solution to implement this last improvement can be to include a heating coil in the window-washer fluid reservoir, which turns on automatically or at the command of the driver himself, who, for example, has a button for that purpose on his dashboard.

But this solution for heating the fluid in a window-washer reservoir via a special control, other than being impractical, has a serious disadvantage, which is a high level of energy consumption and consequently, a non-negligible increase in the volume of fuel necessary to produce that energy at equivalent vehicle performance levels.

The present invention aims to remedy this disadvantage by drawing the calories needed to raise the temperature of the window-washer fluid of a motor vehicle, contained in a reservoir housed in the engine compartment of this vehicle, from the degassing chamber of its cooling system. These calories are to be withdrawn under particular conditions that prevent the temperature of this chamber from undergoing sudden variations, with the risks to the operation of the engine that can ensue.

To this end, the device under consideration, which in its engine compartment has both a pressurized degassing chamber that is part of the engine cooling system and at least one washer fluid reservoir connected to a water pump that withdraws fluid from it and sends it to spray distribution nozzles directed at these windows, is characterized in that the reservoir at least partially surrounds the degassing chamber, leaving between them an intermediate space of a determined width, and in that built into this space is a double-walled hollow body, defining a self-enclosed thermal insulating volume.

The presence of this hollow body functioning as thermal insulation, located between the degassing chamber and the washer fluid reservoir, very significantly reduces the speed at which calories are transferred from this chamber to the reservoir, in such a way that the cooling system to which this chamber is connected is not subjected to any sudden thermal shock, as the transfer of calories from the chamber to the reservoir is gradual and continuous.

Preferably, the self-enclosed thermal insulating hollow body housed in the intermediate space is a vacuum enclosure.

According to another characteristic, the thermal insulating hollow body surrounds the degassing chamber on only part of its outer surface so that there remains visible a level of fluid contained in the chamber in order to continually monitor the quantity of liquid contained therein.

It is advantageous that the connecting branch lines between the degassing chamber and the cooling system be located outside the hollow body.

According to another characteristic of the invention, the washer fluid reservoir has at least one wall on the inside partially separating its liquid contents, this wall delimiting an inner regulation chamber where the fluid is closest to the hollow body and consequently raised to the highest temperature, this area including a reservoir discharge orifice in communication with the water pump that withdraws this fluid from the reservoir and sends it to the spray nozzles.

Other characteristics of a device for heating the fluid of a window-washer reservoir of a motor vehicle, established in accordance with the invention, will appear from the following description of an example of embodiment, given as a guide and not exhaustive, with reference to the attached drawings, in which:

FIG. 1 is a schematic cross-section view of the device under review.

FIG. 2 is a top perspective view of the device of FIG. 1, illustrating various additional accessories.

FIGS. 3a, 3b, 3c are detail views of the degassing chamber and the associated fluid reservoir, with the means devised in this reservoir for withdrawing the fluid having the highest temperature.

In FIGS. 1 and 2, reference 1 indicates the degassing chamber of the cooling system (not shown) of a motor vehicle. The detail of the embodiment of this system, particularly its tubing for circulating fluid through the engine cylinder head and linking it to the radiator, does not matter directly to the invention and is therefore not described herein.

The degassing chamber 1 has a removable cap 2, so that this cooling system can be filled with a fluid suited to this purpose, generally made up of water to which an additive known to prior art is added in suitable proportions, adapted for lowering the surface tension of the fluid and reducing its vaporization when the engine is operating.

The degassing chamber is filled with coolant plus a residual quantity of gas on top, which comes either from a vaporized portion of the fluid in the system itself, from the combustion of the fuel in the engine, or from outside air trapped in the system when it was filled. As is conventional, it has a safety valve (not shown), the system being equipped with an overflow orifice that reduces the quantity of fluid therein during its initial level regulation or subsequent adjustment. The volume of this fluid obviously varies from one vehicle to another, but is generally on the order of 1.5 to 2 liters.

According to the invention, the degassing chamber 1 is surrounded by a reservoir 3 intended to contain the volume of water needed for the use of the window washers of the vehicle, in particular for its windshield and also its rear window, and if need be, on certain cars designated as top-of-the-line, for headlight cleaning systems.

This reservoir 3, whose particular structure also does not matter to the invention and is generally dictated by the space available for it in the engine compartment, and which contains a volume of fluid that can vary, as a guide, between 1.5 and 8 liters depending on the vehicle, is embodied in such a way as to at least partially surround the degassing chamber 1, leaving an intermediate space between them, preferably confined within an airtight, hollow double-walled body 4.

It is advantageous to create a vacuum in the body 4 in order to create a heat screen between the degassing chamber 1, serving as the expansion tank, and the reservoir 3. This way, the transfer of calories between the fluid contained in the cooling system inside the chamber and the fluid in the reservoir occurs very gradually and with no abrupt peaks, in particular by transferring these calories only from at least a certain temperature and by avoiding sudden temperature variations in the chamber, with the previously specified negative effects on engine operation.

FIG. 2 shows in greater detail the device according to the invention, associating the degassing chamber 1 and the washer fluid reservoir 3, with the insulating hollow body 4 interposed between them. Reference 5 indicates the cap that serves to seal the reservoir 3 and to fill it to an appropriate level when it is removed.

Reference 6 indicates the water pump connected to this reservoir to withdraw fluid therefrom and send it pressurized to the spray nozzles of the various window-washers of the vehicle.

In this figure, the degassing chamber 1 has an intermediate zone 7, preferably transparent, making it possible at any time to monitor the level of the fluid in the chamber between two reference points defining a maximum and a minimum level, respectively.

The chamber 1 also has a detector 8, monitoring the level in relation to its minimum value, making it possible to alert the user to an insufficient fluid level and the need to add fluid to the cooling system. In this figure, branch lines 9 and 10 are also schematically represented, through which the chamber 1 is connected to this system.

In FIGS. 3a, 3b, 3c, one finds the degassing chamber 1, the window-washer fluid reservoir 3 and the hollow body 4 housed in the intermediate space separating these two elements. The water pump 6 is also represented schematically.

In these figures, it can be seen that the reservoir 3 can have an intermediate chamber 11 on the inside, located closest to the hollow body 4 in such a way that the fluid contained in this chamber is more quickly brought up to temperature than that in the rest of the reservoir. The water pump withdraws fluid preferentially from this chamber 11, in which the fluid is at a slightly higher temperature.

This way, a simple association is devised between the degassing chamber of the cooling system and the reservoir containing the washer fluid, which is supplied pressurized and at a certain temperature to the spray nozzles and wiper blades, improving the effectiveness and the operation thereof.

This association does not entail any constraint on the positioning of the degassing chamber relative to the cooling system to which it is connected, being located by necessity above the circulation tubing that goes through the engine cylinder head and the connecting lines to the radiator.

Likewise, there is no restriction concerning the actual structure of the washer fluid reservoir, which can be made of an appropriate plastic material or otherwise. This reservoir can be divided into compartments or not, depending on its various uses.

Of course, it goes without saying that the invention is not limited to the embodiments more particularly described and shown; rather, it covers all of the variants.

The invention claimed is:

1. A combination of a motor vehicle and a device for supplying heated fluid to window washers, said combination comprising:

(i) a motor vehicle comprising:

an engine compartment, an engine located in the engine compartment, the engine comprising a cylinder head, an engine cooling system comprising a circuit of coolant fluid, the circuit of coolant fluid comprising circulation tubing through the cylinder head of the engine, a radiator, connecting lines to the radiator, and a degassing chamber, the degassing chamber being pressurized in operation by a residual quantity of gas in the engine cooling system and comprising a safety valve calibrated to regulate the quantity of gas contained in the engine cooling system, and windows, and (ii) a device for supplying heated fluid to window washers comprising:

at least one washer fluid reservoir located in the engine compartment of the motor vehicle, a water pump connected to the washer fluid reservoir, and window washers formed by spray distribution nozzles directed at at least one of the windows of the motor vehicle, wherein the water pump draws fluid from the washer fluid reservoir and sends it to the spray distribution nozzles, wherein the washer fluid reservoir partially surrounds the degassing chamber, leaving between them an intermediate space of a determined width, wherein a double-walled hollow body, delimiting a self-enclosed thermal insulating volume, is built into this intermediate space.

2. The combination according to claim 1, wherein the self-enclosed thermal insulating hollow body housed in the intermediate space is a vacuum enclosure.

3. The combination according to claim 1, wherein the thermal insulating hollow body surrounds the degassing chamber on only part of its outer surface, wherein a vertical segment of the outer surface of the degassing chamber extending from a bottom of the degassing chamber to a top of the degassing chamber is not covered by the hollow body, so that there remains visible a level contained in the degassing chamber in order to continually monitor the quantity of fluid contained therein.

4. The combination according to claim 1, wherein connecting branch lines between the degassing chamber and the cooling system are located outside the hollow body.

5. The combination according to claim 1, wherein the reservoir has at least one wall partially separating its liquid contents, this wall delimiting an internal regulation chamber in which the fluid is the warmest, where the water pump withdraws this fluid and sends it to the spray nozzles.

6. The combination according to claim 2, wherein the thermal insulating hollow body surrounds the degassing chamber on only part of its outer surface, wherein a vertical segment of the outer surface of the degassing chamber extending from a bottom of the degassing chamber to a top of the degassing chamber is not covered by the hollow body, so that there remains visible a level contained in the degassing chamber in order to continually monitor the quantity of fluid contained therein.

7. The combination according to claim 2, wherein connecting branch lines between the degassing chamber and the cooling system are located outside the hollow body.

8. The combination according to claim 3, wherein connecting branch lines between the degassing chamber and the cooling system are located outside the hollow body.

9. The combination according to claim 6, wherein connecting branch lines between the degassing chamber and the cooling system are located outside the hollow body.

10. The combination according to claim 2, wherein the reservoir has at least one wall partially separating its liquid contents, this wall delimiting an internal regulation chamber in which the fluid is the warmest, where the water pump withdraws this fluid and sends it to the spray nozzles.

11. The combination according to claim 3, wherein the reservoir has at least one wall partially separating its liquid contents, this wall delimiting an internal regulation chamber in which the fluid is the warmest, where the water pump withdraws this fluid and sends it to the spray nozzles.

12. The combination according to claim 4, wherein the reservoir has at least one wall partially separating its liquid contents, this wall delimiting an internal regulation chamber in which the fluid is the warmest, where the water pump withdraws this fluid and sends it to the spray nozzles.

13. The combination according to claim 6, wherein the reservoir has at least one wall partially separating its liquid contents, this wall delimiting an internal regulation chamber in which the fluid is the warmest, where the water pump withdraws this fluid and sends it to the spray nozzles.

14. The combination according to claim 7, wherein the reservoir has at least one wall partially separating its liquid contents, this wall delimiting an internal regulation chamber in which the fluid is the warmest, where the water pump withdraws this fluid and sends it to the spray nozzles.

15. The combination according to claim 8, wherein the reservoir has at least one wall partially separating its liquid contents, this wall delimiting an internal regulation chamber in which the fluid is the warmest, where the water pump withdraws this fluid and sends it to the spray nozzles.

16. The combination device according to claim 9, wherein the reservoir has at least one wall partially separating its liquid contents, this wall delimiting an internal regulation chamber in which the fluid is the warmest, where the water pump withdraws this fluid and sends it to the spray nozzles.

17. The combination according to claim 1, wherein the degassing chamber is located in the engine compartment of the motor vehicle above the circulation tubing and the connecting lines of the cooling system.

18. The combination according to claim 1, wherein the washer fluid reservoir partially but not completely surrounds the degassing chamber.

19. The combination according to claim 18, wherein a vertical segment of the outer surface of the degassing chamber extending from a bottom of the degassing chamber to a top of the degassing chamber is not covered by the hollow body.

* * * * *